United States Patent Office 2,927,850
Patented Mar. 8, 1960

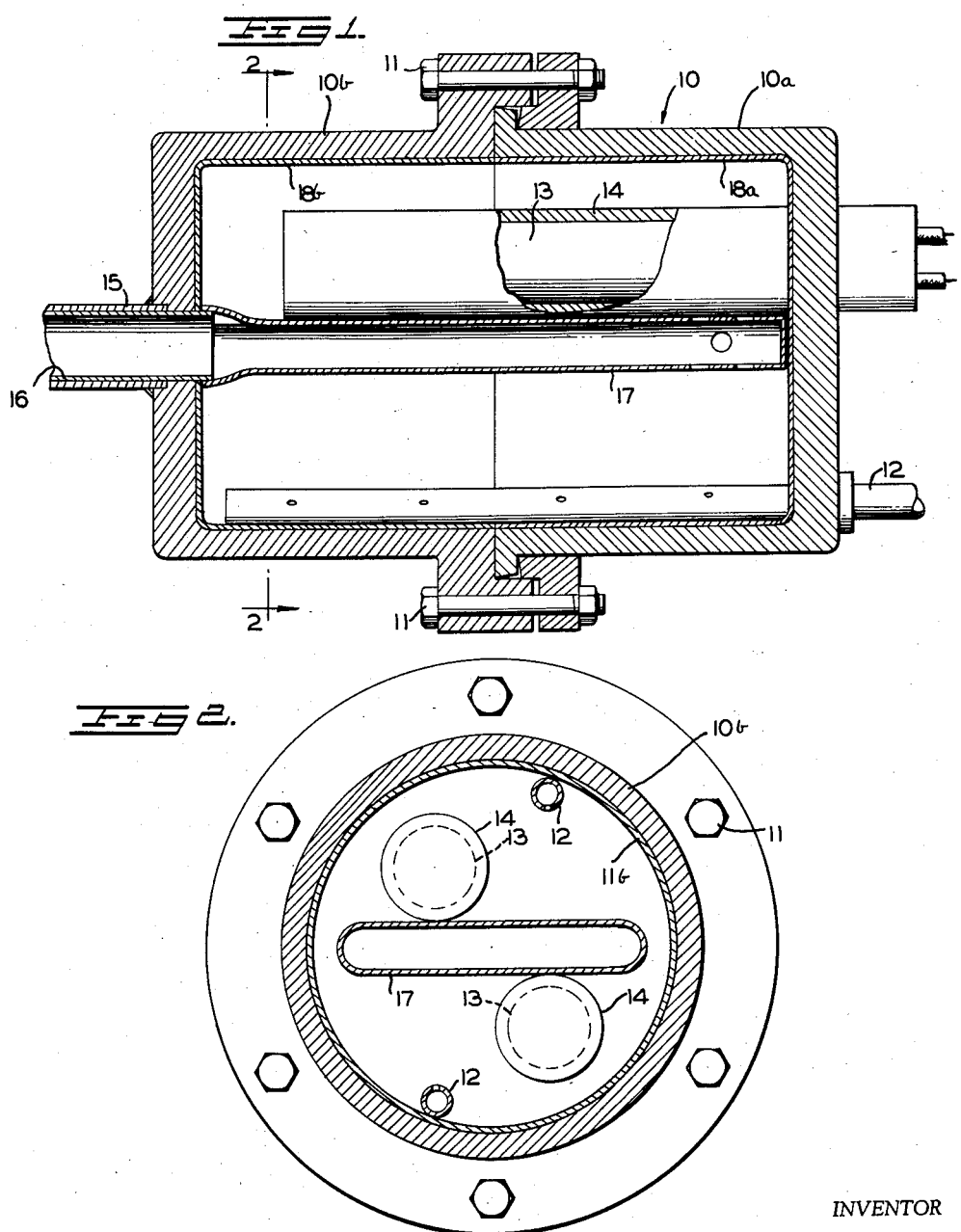

2,927,850

METHOD FOR THE DECOMPOSITION OF ETHYLENE OXIDE

Harry B. Forney and Leonard Greiner, Richmond, Va., assignors to Experiment Incorporated, Richmond, Va., a corporation of Virginia Application February 5, 1958, Serial No. 713,508

2 Claims. (Cl. 52—.5)

The invention relates to a method and apparatus for the production of gases by the exothermic thermal decomposition of organic substances.

More particularly the invention is directed to a method and apparatus for the conversion of exothermally decomposable substances, such as ethylene oxide and the like into gases useful for the generation of power.

A serious disadvantage in the production of gases by the exothermic thermal decomposition of organic substances, such as ethylene oxide, is the formation of carbon in the reaction space. This tends to reduce the capacity of, or entirely close off, inlet and outlet passages, to reduce the capacity of the reaction space, and to greatly interfere with effective heat transfer between the decomposition products and the organic substances.

A primary object of the invention is to provide a method and apparatus for the exothermic thermal decomposition of organic substances whereby the formation and deposition of carbon is wholly or substantially eliminated.

We have found that the formation of carbon in the thermal decomposition can be controlled by suitable selection of the surfaces in contact with the decomposing substances.

More particularly we have found that the formation of carbon may be substantially or entirely eliminated by passing a stream of the organic substance into a zone bounded by a metallic surface selected from the group consisting of titanium, molybdenum and copper and maintained at a temperature above the thermal decomposition temperature of the organic substance.

In its apparatus aspect, the invention comprises the provision of wall means defining a reaction space at least the portion of the wall means contiguous to the reaction space consisting of titanium, molybdenum or copper, and suitable inlet means for supplying the organic substance to the reaction space and outlet means for removing gaseous decomposition products from the reaction space. In order to facilitate the initiation of the exothermic decomposition, heat supply means, such as electric sparking devices, electric resistance heating elements and the like are advantageously provided in the reaction space and such devices should be made of, or coated or sheathed with one or more of the metals, titanium, molybdenum or copper. Likewise heat transfer devices effective to maintain the temperature in the reaction space above the decomposition temperature of the organic substance may be provided and should be likewise made of, or coated or sheathed with one or more of the metals, titanium, molybdenum or copper.

The wall members defining the reaction space may be made of one of the said metals, or coated or lined therewith on the interior surfaces thereof.

In other words, all of the surfaces contiguous to the reaction space should consist of at least one of the metals, titanium, molybdenum or copper. Different ones of said metals may be used in different portions of the reactor as may be convenient or economical.

The surfaces contiguous to the reaction space may be coated with one or more of said metals, for example, by one of the known spray coating methods, or by electrodeposition or by any method which will provide a substantially impervious adherent coating.

The invention will be more particularly described with reference to the accompanying drawing in which:

Figure 1 is a longitudinal section through a gas generator embodying the principles of the invention; and Figure 2 is a transverse section on line 2—2 of Figure 1.

In the illustrative embodiment of the invention shown in the drawing, 10 indicates generally a gas generator chamber consisting of two end portions 10a, 10b having mating flange faces and means such as bolts 11 for maintaining the flange face in gas tight contact. Each of the end portions is provided with a titanium liner 18a, 18b respectively.

The chamber portion 10a also carries two inlet lines 12 made of titanium tubing and perforated as shown for supplying the substance to be decomposed to the decomposition space and two resistance heating cartridges 13 encased in titanium sheaths 14.

The chamber portion 10b carries an outlet nozzle 15 having a titanium liner 16. A flattened hollow member 17 of sheet titanium having inlet openings at one end thereof and opening at the other end into the outlet nozzle 15 functions as a heat exchanger.

In operation of the generator to produce gaseous decomposition products from ethylene oxide, power is supplied to the heating cartridges to heat the outer sheaths thereof above the decomposition temperature of the ethylene oxide, for example, to about 1000° F. and ethylene oxide is supplied to the chamber through inlets 12. As soon as decomposition is initiated the power supply to the heating cartridges is cut off and the metallic surfaces of the chamber are thereafter maintained at or above the decomposition temperature by heat exchange with the products of the exothermic decomposition.

It has been found that two electrical heating cartridges rated at 1000 watts at 115 volts, and approximately ½ inch in diameter and 3½ inches in length with a wattage density of about 350 watts per square inch of surface effectively initiate decomposition at a fuel flow of 0.027 pound per second in one to two minutes after which the decomposition is self-sustaining. After decomposition is initiated a smooth flow of gaseous decomposition products from the generator is maintained over a wide range of inlet fuel temperatures, for example, from −75° to 212° F. and at chamber pressures of from 90 to 500 p.s.i.g., without any harmful deposition of carbon on the metallic surfaces of the generator.

It will be understood that the details of construction and operation of the generator shown in the drawing and described above are merely illustrative and that the invention broadly comprises the apparatus and method as defined in the appended claims.

We claim:

1. A method for the production of gases by the exothermic thermal decomposition of ethylene oxide which comprises passing a stream of ethylene oxide into heat transfer contact with a metallic member selected from the group consisting of titanium, molybdenum and copper and maintained at a temperature above the thermal decomposition temperature of ethylene oxide by the transfer of heat thereto from the gaseous decomposition products.

2. A method for the production of gases by the exothermic thermal decomposition of ethylene oxide which comprises passing a stream of ethylene oxide into a zone maintained by the heat of decomposition at a temperature above the thermal decomposition temperature of ethylene oxide and bounded by metallic surfaces selected from the group consisting of titanium, molybdenum and copper.

References Cited in the file of this patent

UNITED STATES PATENTS

| | | |
|---|---|---|
| 1,732,381 | Schmidt | Oct. 22, 1929 |
| 1,894,764 | Grosskinsky | Jan. 17, 1933 |
| 2,286,909 | Goddard | June 16, 1942 |
| 2,433,943 | Zwicky et al. | Jan. 6, 1948 |
| 2,622,671 | Johnson | Dec. 23, 1952 |
| 2,648,190 | Maisner | Aug. 11, 1953 |
| 2,782,592 | Kolfenbach | Feb. 26, 1957 |

OTHER REFERENCES

Heckert et al.: JACS, vol. 51, November 1929, pages 2706–2717.

Webster's New International Dictionary, Unabridged, 2nd ed., page 576 (1939), G. & C. Merriam Co., Springfield, Mass.

Ley: "Aircraft Engineering," page 228, September 1935.

Perry: "Chemical Engineers' Handbook," 3rd ed., pages 473 and 474 (1950).

Robinson: "Jet Propulsion Journal," vol. 24, No. 2, March-April 1954, pages 111, 112.